(12) United States Patent
Hayes (10) Patent No.: US 8,818,416 B2
(45) Date of Patent: Aug. 26, 2014

(54) COMMUNICATING BASED ON NAVIGATION DESTINATION

(71) Applicant: Google Inc., Mountain View, CA (US)

(72) Inventor: Barry Hayes, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/908,395

(22) Filed: Jun. 3, 2013

(65) Prior Publication Data

US 2013/0337839 A1    Dec. 19, 2013

Related U.S. Application Data

(63) Continuation of application No. 13/525,023, filed on Jun. 15, 2012, now Pat. No. 8,478,307.

(51) Int. Cl.
*H04W 4/02* (2009.01)

(52) U.S. Cl.
USPC .................. 455/456.3; 455/457; 701/431

(58) Field of Classification Search
USPC ............... 455/456.1–457, 414.1–414.2; 701/400–443, 532, 533
See application file for complete search history.

(56) References Cited

U.S. PATENT DOCUMENTS

| | | | |
|---|---|---|---|
| 5,724,243 A | 3/1998 | Westerlage et al. | |
| 6,148,261 A * | 11/2000 | Obradovich et al. | 701/438 |
| 6,411,891 B1 | 6/2002 | Jones | |
| 6,700,506 B1 | 3/2004 | Winkler et al. | |
| 2001/0046884 A1 * | 11/2001 | Yoshioka | 455/564 |
| 2005/0114014 A1 | 5/2005 | Isaac | |
| 2006/0047417 A1 | 3/2006 | Tanabe | |
| 2008/0036586 A1 * | 2/2008 | Ohki | 340/539.13 |
| 2008/0243386 A1 | 10/2008 | Kumar et al. | |
| 2009/0005981 A1 * | 1/2009 | Forstall et al. | 701/211 |
| 2009/0181699 A1 * | 7/2009 | Tysowski | 455/457 |
| 2009/0240428 A1 * | 9/2009 | Shahrestani | 701/201 |
| 2010/0094539 A1 | 4/2010 | Tomizawa | |
| 2010/0216491 A1 * | 8/2010 | Winkler et al. | 455/457 |

FOREIGN PATENT DOCUMENTS

| | | |
|---|---|---|
| DE | 10023784 A1 | 11/2001 |
| EP | 1944724 A1 | 7/2008 |
| JP | 11132778 A | 5/1999 |
| JP | 2001141478 A | 5/2001 |
| JP | 2001167385 A | 6/2001 |
| JP | 2002257574 | 9/2002 |
| JP | 2002350165 A | 12/2002 |

(Continued)

OTHER PUBLICATIONS

Korean Office Action from Korean application No. 2013-0068656, dated Nov. 22, 2013, 8 pages.

(Continued)

*Primary Examiner* — Kashif Siddiqui
(74) *Attorney, Agent, or Firm* — Shumaker & Sieffert, P.A.

(57) ABSTRACT

In general, this disclosure describes techniques for providing a user of a source computing device with the ability to communicate with a destination communication device, while using a navigation application that provides directions to a geographical location associated with the destination communication device. Specifically, the source computing device may provide within the navigation application a mechanism, such as a selectable item, that upon selection allows the user to communicate with the destination communication device without exiting the navigation application that is providing directions to the geographical locations associated with the destination communication device.

20 Claims, 7 Drawing Sheets

(56) References Cited

FOREIGN PATENT DOCUMENTS

| | | | |
|---|---|---|---|
| JP | 2004242154 | A | 8/2004 |
| JP | 2004251692 | A | 9/2004 |
| JP | 2004320564 | | 11/2004 |
| JP | 2005127949 | A | 5/2005 |
| JP | 2007163413 | A | 6/2007 |
| JP | 2007240307 | A | 9/2007 |
| JP | 2010249758 | A | 11/2010 |
| KR | 20080008638 | A | 1/2008 |
| KR | 20110043971 | A | 4/2011 |
| WO | 2011030791 | A1 | 3/2011 |
| WO | 2011107149 | A1 | 9/2011 |

OTHER PUBLICATIONS

Examination Report from corresponding Australian application No. 2013206319, dated Aug. 12, 2013, 2 pp.
Search and Examination Report dated Aug. 20, 2013 for British Application No. 1310553.1 (9 pgs.).
Office Action from U.S. Appl. No. 13/524,998, dated Aug. 24, 2012, 22 pp.
U.S. Appl. No. 13/524,998, by Barry Hayes, filed Jun. 15, 2012.
Barry Hayes, "Communicating Based on Navigation Destination," U.S. Appl. No. 13/525,023, filed Jun. 15, 2012.
Office Action from U.S. Appl. No. 13/525,023, dated Aug. 22, 2012, 13 pp.
Response to Office Action dated Aug. 22, 2012 from U.S. Appl. No. 13/525,023, filed Nov. 20, 2012, 9 pp.
Notice of Allowance from U.S. Appl. No. 13/525,023, dated Dec. 31, 2012, 16 pp.
Final Office Action from Korea counterpart application No. 2013-0068656, dated Mar. 7, 2014, 12 pp.

* cited by examiner

COMMUNICATING BASED ON NAVIGATION DESTINATION

This application is a continuation of U.S. application Ser. No. 13/525,023 filed Jun. 15, 2012, which is incorporated by reference herein in its entirety.

TECHNICAL FIELD

The disclosure relates to interactive navigation systems.

BACKGROUND

A user may utilize a computing device to obtain directions to a destination location using a navigation application. Computing devices, such as mobile devices, can be used to provide users with the convenience of having access to navigation assistance to a destination, using such navigation applications as mapping tools or GPS applications.

SUMMARY

In general, this disclosure describes techniques for providing a user of a computing device the ability to communicate with another computing device or communication device while driving. Specifically, the techniques of this disclosure provide the ability to place a phone call to a destination communication device associated with a destination for which a source computing device is providing directions. According to these techniques, location contact information associated with a destination (e.g., geographical location) may be utilized by a navigation application on source computing device to provide directions to the destination, and communication contact information associated with the destination (e.g., phone number) may be utilized to provide the user of the source computing device with the ability to communicate with the destination communication device directly from and without exiting the navigation application.

In one example, the disclosure is directed to a method comprising providing for display, by a computing device, navigational directions from a first geographical location associated with the computing device to a second geographical location, wherein the second geographical location is associated with at least one communication device, determining, by the computing device, contact information associated with the at least one communication device, providing, by the computing device, a functionality associated with the contact information, and responsive to receiving a user action activating the functionality, initiating communication from the computing device to the at least one communication device, based on the contact information, while the navigational directions are displayed by the computing device.

In another example, the disclosure is directed to a computing device comprising one or more processors, a module operable by the one or more processors and configured to provide for display navigational directions from a first geographical location associated with the computing device to a second geographical location, wherein the second geographical location is associated with at least one communication device, to determine contact information associated with the at least one communication device, and to provide a functionality associated with the contact information, and a network interface for initiating communication from the computing device to the at least one communication device, based on the contact information, while the navigational directions are displayed by the computing device, in response to receiving a user action activating the functionality.

In another example, the disclosure is direction to a computer-readable storage medium, in a computing device, encoded with instructions that, when executed, cause one or more processors to perform operations comprising providing for display navigational directions from a first geographical location associated with the computing device to a second geographical location, wherein the second geographical location associated with at least one communication device, determining contact information associated with the at least one communication device, providing a functionality associated with the contact information, and responsive to receiving a user action activating the functionality, initiating communication from the computing device to the at least one communication device, based on the contact information, while the navigational directions are displayed by the computing device.

The details of one or more examples are set forth in the accompanying drawings and the description below. Other features, objects, and advantages will be apparent from the description and drawings, and from the claims.

DETAILED DESCRIPTION

Computing devices, such as mobile devices, can be used to provide users with the convenience of having access to navigation assistance to a destination, using a navigation application such as, for example, mapping tools or GPS applications. Additionally, computing device, such as mobile devices, may provide other functionalities and applications, which may not be available when the user is using one application, such as the navigation application. Particularly, in one example, when using the navigation application, the user may not be able to utilize the dialing application, i.e., may not be able to make a phone call, without exiting the navigation application. For example, the user may want to contact a person or entity associated with the destination, while driving using directions to the destination provided by the navigation application. The user would have to close to navigation application, search for the desired contact information, and then contact the person or entity. Once the contact is made, the user may be able to resume the navigation application. However, in some situations, it may not be convenient to exit the navigation application and miss certain directions. Additionally, trying to look up contact information and making a call while driving may not be safe and/or legal.

In general, this disclosure describes techniques for providing a user of a computing device the ability to communicate with a communication device (e.g., another computing device) while driving. Specifically, the techniques of this disclosure provide the ability to place a phone call to a destination communication device associated with a destination for which a source computing device is providing directions. According to these techniques, location contact information associated with a destination (e.g., geographical location)

may be utilized by a navigation application on source computing device to provide directions to the destination, and communication contact information associated with the destination (e.g., phone number) may be utilized to provide the user of the source computing device with the ability to communicate with the destination communication device directly from and without exiting the navigation application. In this manner, a communication application (e.g., phone, text message, or the like) is invoked from within another application.

The techniques of this disclosure provide a user with the ability to contact an entity associated with the destination computing device while utilizing a navigation application to obtain directions to the destination, without exiting the navigation application. The techniques of this disclosure may eliminate the need for a user to exit one application to utilize another, specifically, to utilize or invoke a communication application. According to these techniques, communication contact information (e.g., phone number) may be entered by the user or retrieved by the navigation application.

In one example, the user may utilize a navigation application to obtain directions to a destination. The user may associate the destination with contact information, by indicating a name of a person or entity, which the navigation application may utilize to retrieve contact information from the user's contact list or from the Internet (e.g., if the destination is a business), or the user may enter the contact information when entering the destination in the navigation application. The contact information may include location contact information (e.g., geographical information associated with the destination, an address) and communication contact information (e.g., phone number, email address, or the like).

When the navigation application is running and providing the user with directions to the destination based on the location contact information, a link may be displayed on the navigation application screen. The link may be associated with the communication contact information entered by the user or retrieved by the navigation application. While driving, the user may wish to contact a person or entity at the destination, without stopping or exiting the navigation application. The user may select the link, which initiates a communication application (e.g., phone) and places a call to the associated contact phone number, without exiting the navigation application. In this manner, the user may be able to continue utilizing the navigation application, and place a phone call. In one example, the link may initiate a pre-set communication, e.g., send a text message indicating the user is on the way. In other examples, the link may bring up a list of numbers, also displayed as links, associated with the destination, and the user may select one of the numbers to call. This may be useful if several persons are associated with the destination. In some examples, no link is displayed on the navigation application screen. Instead, a functionality associated with the communication contact information may be provided. The user may activate the functionality via voice input, a gesture input, or any other suitable user input, to initiate a communication application to communicate via the communication contact information.

While this disclosure discusses examples that involve driving, the techniques of this disclosure may be applicable to other examples where a user with a computing device may be on his/her way to a destination where the communication device may be located. For example, the user may be on a bike ride, a fishing trip, hiking, or the like. Also, while the disclosure discusses examples of specific applications, i.e., invoking a communication application from a navigation application, techniques of this disclosure may be applicable to other applications where one application may be invoked directly from another application, e.g., invoking the navigation application from a communication application, where during a call, one user command may invoke the navigation application to provide directions to a location associated with the contact associated with the call.

Figure 1:
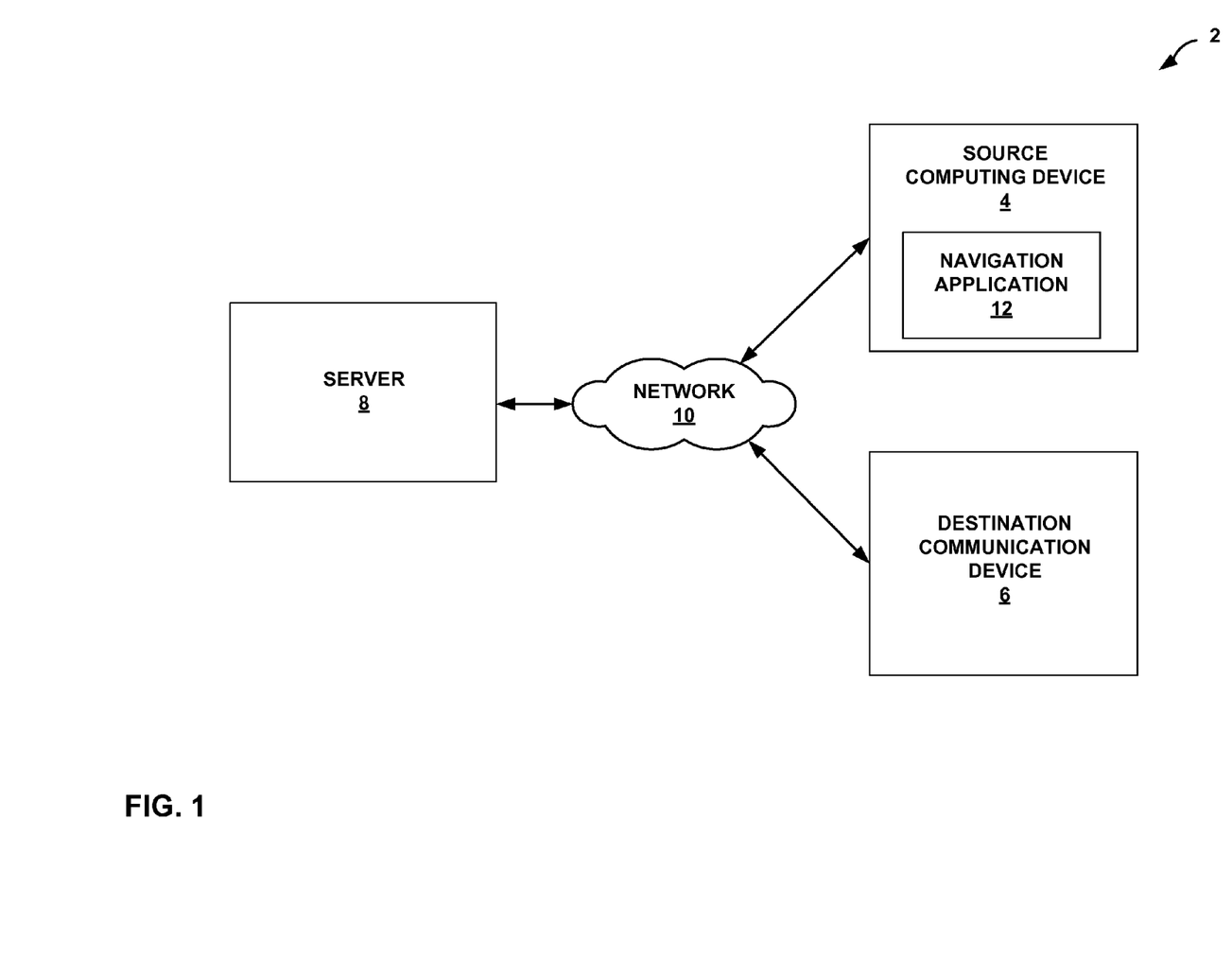
FIG. 1 is a block diagram illustrating an example system in accordance with one or more aspects of this disclosure.

FIG. 1 is a block diagram illustrating an example system 2 in accordance with one or more aspects of this disclosure. As illustrated in FIG. 1, communication system 2 may include source computing device 4, destination communication device 6, server 8, and network 10. In one example, source computing device 4 may include navigation application 12. While this discussion describes the techniques of this disclosure in terms of a navigation application, it should be understood that aspects of this disclosure may be applicable to other types of applications on a computing device, where it may be useful to access another application without exiting a current one, specifically utilize a communication application without stopping or exiting another application running on the computing device.

In some examples, source computing device 4 and destination communication device 6 include, but are not limited to, a mobile device, an automotive console, a set top box, and the like. For example, source computing device 4 may comprise or be part of a wireless communication device (e.g., wireless mobile handset or device), a video telephone, a digital multimedia player, a personal digital assistant (PDA), a video game console, a laptop computer, a tablet computer, a global positioning system (GPS) device, or other devices. For purposes of illustration only, each of computing device 4 and communication device 6 may at times be described in this disclosure as a mobile device or mobile phone device, but aspects of this disclosure should not be considered limited to mobile phone devices. In one example, destination communication device 6 may be a conventional communication device such as a conventional telephone device that receives and makes phone calls.

In one example, source computing device 4 and destination communication device 6 may include Wi-Fi or Bluetooth capabilities or other communication capabilities and may be configured to communicate over a network 10. Computing device 4 and communication device 6 may utilize network 10 to communicate with each other and other devices and/or servers (e.g., server 8). For example, source computing device 4 may communicate with destination communication device 6 using a communication application. The communication application may be, for example, dialing application, text messaging, and the like, to allow the user of source device 4 to communicate (e.g., call or send a text message to) destination communication device 6.

In one example, source computing device 4 and destination communication device 6 may communicate directly through network 10. In another example, source computing device 4 and destination communication device 6 may communicate through server 8. Source computing device 4 and destination communication device 6 may also communicate with server 8 for other purposes during operation. For example, navigation application 12 may require information while providing navigation information to the user of source computing device 4. For example, navigation application 12 may obtain from server 8 geographical location information associated with destination device 6. In this example, requests and information communicated by either device may be communicated to server 8 and retrieved from server 8. For example, source computing device 4 may provide its location updates and the location of the destination to server 8, and server 8 may generate or obtain the appropriate navigation information.

In one example, source computing device 4 may receive or obtain information associated with a destination corresponding to destination communication device 6. The information may comprise contact information. The contact information may include location contact information associated with the destination such as, for example, an address or a geographical location. The contact information may also include communication contact information that source computing device 4 may utilize to contact destination communication device 6, for example, a phone number or an email address.

In one example, contact information associated with the destination may be entered directly by the user into navigation application 12. For example, the user may provide to navigation application 12 the location contact information to obtain directions to the destination. The user may also provide the communication contact information associated with the destination. In one example, navigation application 12 may provide an optional field for entering the communication contact information in addition to the location contact information. In another example, navigation application 12 may retrieve the contact information from a list of contacts in source computing device 4 (e.g., an address book). In another example, navigation application 12 may be launched from another application that provides the user with the ability to select an option to obtain directions to a destination, such as, from a business website, a Yellow Pages application, or the like. In another application, navigation application 12 may provide the user with the ability to search for businesses or addresses through navigation application 12. In each of these examples, navigation application 12 may obtain location contact information to utilize in providing directions to the user, in addition to obtaining communication contact information, when available.

During its operation, navigation application 12 may display for the user on a user interface of source computing device 4 text and/or graphics associated with directions to the destination based on the location contact information. Navigation application 12 may also display a selectable item for the user, which may be utilized to initiate contact with a person or entity associated with the destination based on the communication contact information. The user may select the selectable item, which may result in communicating with the person or entity associated with the destination without exiting the navigation application. In one example, selecting the selectable item may, for example, place a call to an associated phone number. In another example, selecting the selectable item may, for example, send a text message to as associated electronic address or phone number, where the message may be previously composed by the user. In another example, selecting the selectable item may display a list of one or more options, e.g., multiple phone numbers, whether the user wants to call or send a text, and the like. In one example, the selectable item may be, for example, a link displayed on a user interface of source computing device 4. In one example, the user may activate the selectable item, e.g., the link, by touching the screen to "click" the item. In another example, the user may activate the selectable item (e.g., the link) by using a voice command instructing source computing device 4 to activate the link.

Figure 2A:
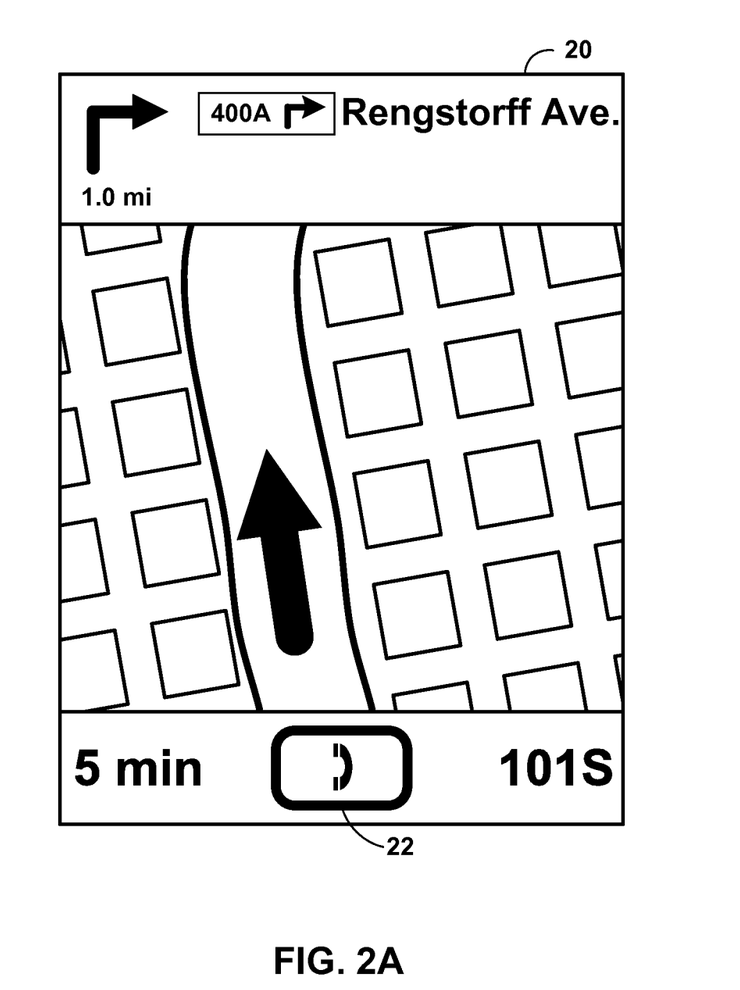
FIGS. 2A-2D are conceptual diagrams illustrating an example graphical user interface of a navigation application in accordance with one or more aspects of this disclosure.

FIG. 2A-2D are conceptual diagrams illustrating the graphical user interface (GUI) 20 of navigation application 12 running on source computing device 4 according to aspects of the disclosure. As shown in FIG. 2A, GUI 20 of navigation application 12 may present navigation information, such as turn-by-turn directions, and the display of source computing device 4 may display user interface 20. GUI 20 may include GUI widget 22, which may be the selectable item described above with respect to FIG. 1. GUI widget 22, when selected or otherwise enabled, may be used to initiate communications with the person or entity associated with the destination. For example, selecting GUI widget 22 may place a call to a phone number associated with the destination. In another example, selecting GUI widget 22 may send a text message to a phone number or electronic address associated with the destination. The text message, in some examples, may be previously composed by the user or may be canned responses stored in navigation application 12.

In some examples, GUI widget 22 may be selected by detecting contact on a representation of GUI widget 22 displayed at the touch-sensitive display of source computing device 4. In other examples, a user may control a cursor (not shown) in GUI 20 to select GUI widget 22. In some examples, GUI widget 22 may be activated via voice commands received at computing device 4 or gestures detected at the touch-sensitive display of source computing device 4.

In some examples, GUI 20 may not include GUI widget 22. Instead, source computing device 4 may accept voice commands, gestures performed at the touch-sensitive display of source computing device 4, or any other input actions that may activate the functionality of communicating with the person or entity associated with the destination described above without exiting the navigation application 12.

Figure 2B:
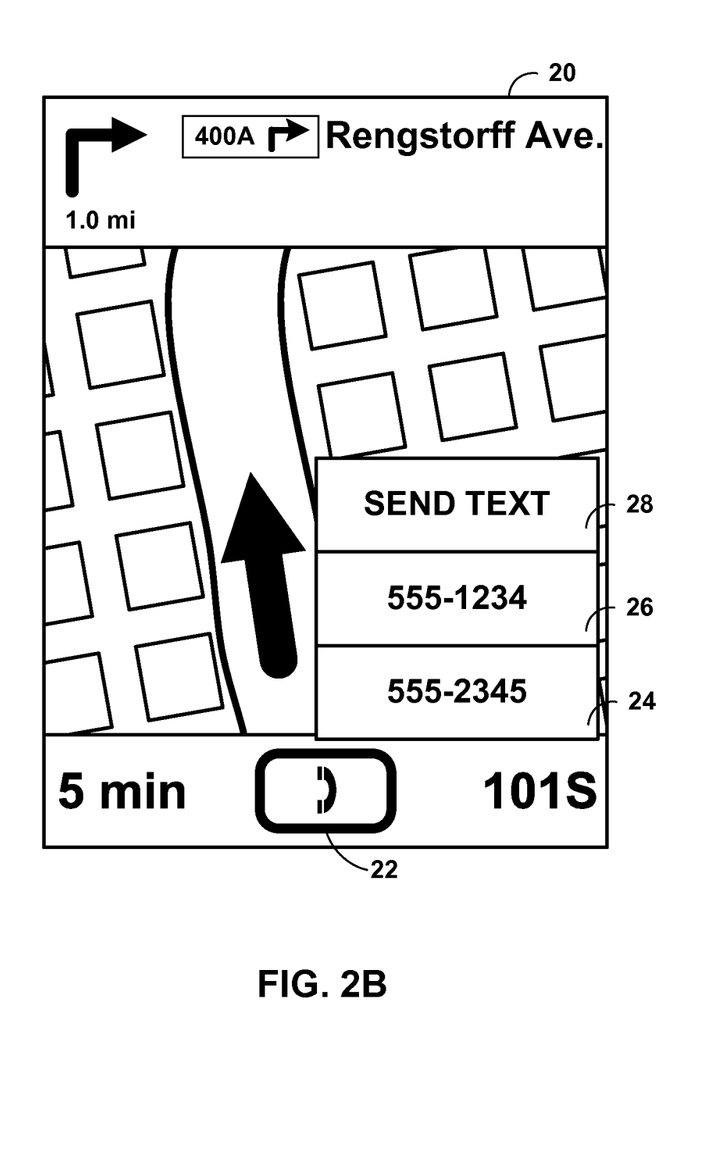

As shown in FIG. 2B, after selection of GUI widget 22, GUI 20 of navigation application 12 may present a list of one or more options. For example, if the person or entity associated with the destination has multiple associated telephone numbers (e.g., mobile and home phone numbers, or husband and wife's phone numbers), navigation application 12 may present a list of phone number entries 24 and 26 that may be selected to place a call to that number or to send a text that number. The list of options may also include additional entries, such as a "send text" entry 28 that may be selected to send a text message.

In some examples, entries 24, 26, and 28 may be selected by detecting contact on a representation of one of the entries 24, 26, and 28 displayed at the touch-sensitive display of source computing device 4. In other examples, one or more of the entries 24, 26, and 28 may be selected via voice command, selection by a cursor, a gesture performed at the touch-sensitive display of source computing device 4, or by any other suitable method.

Figure 2C:
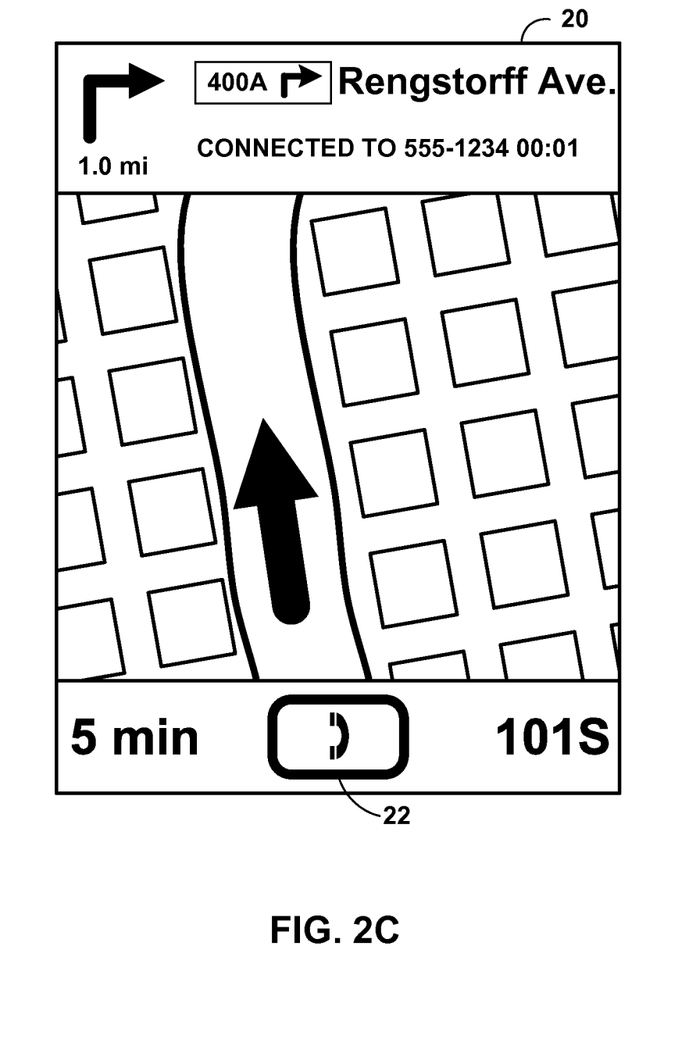
Figure 2D:
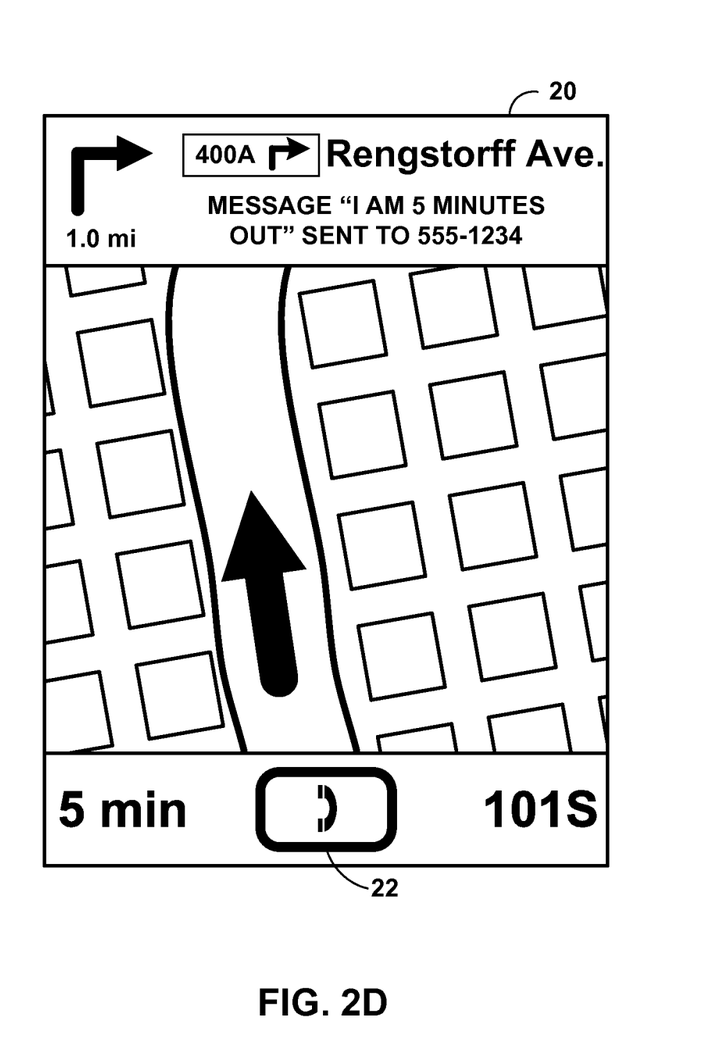

Communications can be initiated from source computing device 4 to one or more other communication devices, based on the contact information, while navigational directions are displayed by source computing device 4. As shown in FIG. 2C, voice-based communication, such as a phone call, may be placed between source computing device 4 and destination communication device 6 while the navigational directions are displayed by source computing device 4. As shown in FIG. 2D, text-based communication, such as a text message, may be communicated from source computing device 4 and destination communication device 6 while the navigational directions are displayed by source computing device 4. The message may be automatically customized by source computing device 4 based on the status (e.g., location) of source computing device 4. For example, the message may include the amount of time or the distance remaining until source computing device 4 reaches the destination location.

Figure 3:
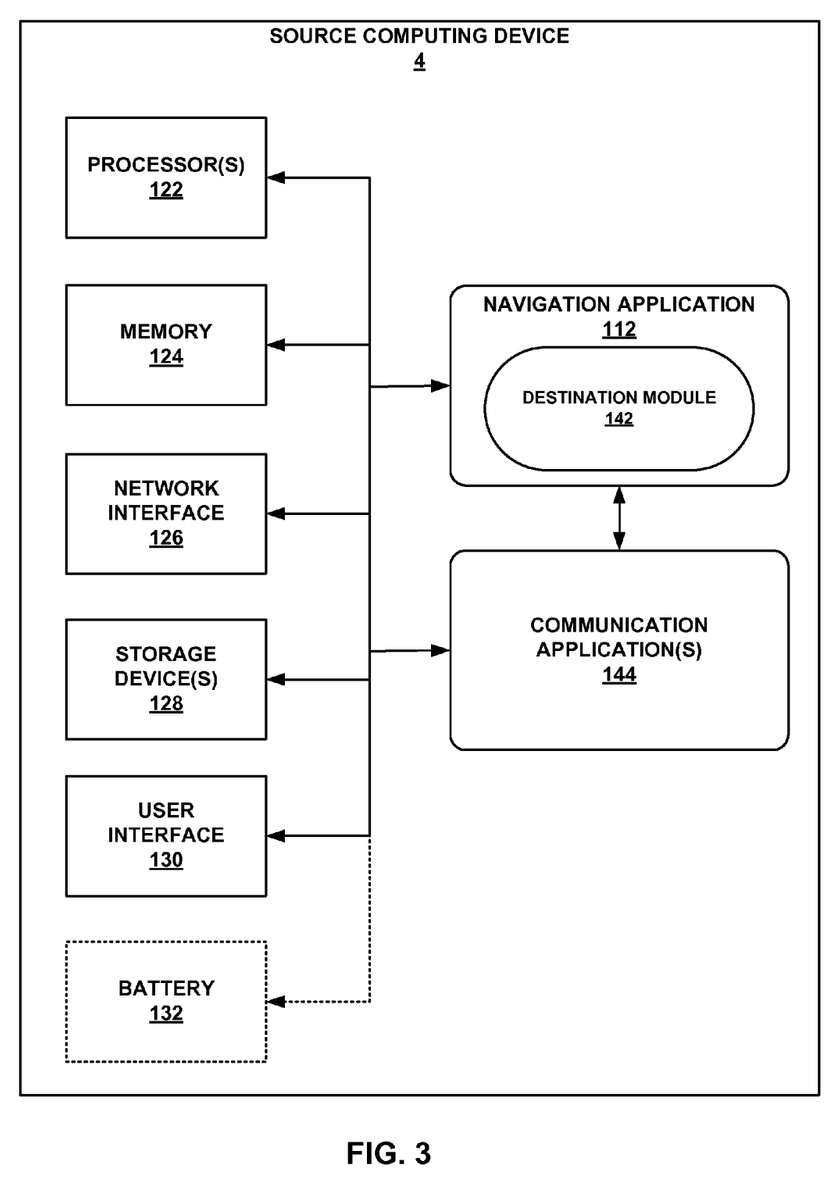
FIG. 3 is a block diagram illustrating further details of one example of the computing device shown in FIG. 1.

FIG. 3 is a block diagram illustrating further details of source computing device 4 shown in FIG. 1. FIG. 3 illustrates only one particular example of source computing device 4, and many other example embodiments of source computing device 4 may be used in other instances. As shown in the example of FIG. 3, source computing device 4 includes one or more processors 122, memory 124, a network interface 126, one or more storage devices 128, user interface 130, and an optional battery 132. For example, if source computing device 4 comprises a mobile device, source computing device 4 may include battery 132. Each of components 122, 124, 126, 128, 130, and 132 may be interconnected via one or more buses for inter-component communications. Processors 122 may be configured to implement functionality and/or process instructions for execution within source computing device 4. Processors 122 may be capable of processing instructions stored in memory 124 or instructions stored on storage devices 128.

User interface 130 may include, for example, a monitor or other display device for presentation of visual information to a user of source computing device 4. User interface 130 may further include one or more input devices to enable a user to input data, such as a manual keyboard, mouse, touchpad, trackpad, etc. In some examples, user interface 130 may comprise a presence-sensitive user interface device such as, for example, a touch-sensitive display, which may be used both to receive and process user input and also to display output information. User interface 130 may further include printers or other devices to output information. In various instances in the description contained herein, references made to user interface 130 may refer to portions of user interface 130 (e.g., touch-sensitive display) that provide user input functionality. In one example, user interface 130 may be a touch-sensitive display that is responsive to tactile input by the user (e.g., by user's finger or stylus pen). User interface 130 may include soft buttons and/or hard buttons, which may be utilized by a user to provide input and/or make selections.

Memory 124 may be configured to store information within source computing device 4 during operation. Memory 124 may, in some examples, be described as a computer-readable storage medium. In some examples, memory 124 is a temporary memory, meaning that a primary purpose of memory 124 is not long-term storage. Memory 124 may also be described as a volatile memory, meaning that memory 124 does not maintain stored contents when the computer is turned off. Examples of volatile memories include random access memories (RAM), dynamic random access memories (DRAM), static random access memories (SRAM), and other forms of volatile memories known in the art. In some examples, memory 124 may be used to store program instructions for execution by processors 122. Memory 124 may be used by software or applications running on source computing device 4 (e.g., navigation application 12 shown in FIG. 1) to temporarily store information during program execution.

Storage devices 128 may also include one or more computer-readable storage media. Storage devices 128 may be configured to store larger amounts of information than memory 124. Storage devices 128 may further be configured for long-term storage of information. In some examples, storage devices 128 may comprise non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Source computing device 4 also includes network interface 126. Source computing device 4 may utilize network interface 126 to communicate with external devices (e.g., one or more servers 8, other computing devices) via one or more networks (e.g., network 10), such as one or more wireless/wired networks (e.g., Wi-Fi, cellular, telephonic, etc.). Source computing device 4 may utilize network interface 126 in response to execution of one or more applications that require transferring data to and/or from other devices (e.g., other computing devices, servers, or the like). Source computing device 4 may include Wi-Fi or Bluetooth capabilities, for example, which may be configurable to establish communication with destination communication device 110 (FIG. 1) through network interface 126.

Any applications implemented within or executed by source computing device 4 (e.g., navigation application 112 and communication applications 144) may be implemented or contained within, operable by, executed by, and/or be operatively coupled to processors 122, memory 124, network interface 126, storage devices 128, and/or user interface 130. In one example, source computing device 4 may include navigation application 112, which provides the user with navigational directions to a destination based on a current geographical location associated with source computing device 4 and a location associated with the destination. Navigation application 112 may also provide the user with the ability to initiate communication with a communication device associated with the destination.

In one example, navigation application 112 may obtain information associated with the destination, where the information may comprise contact information. The contact information may include location contact information, e.g., a geographical location. Navigation application 112 may determine the current geographical location associated with source computing device 4. Navigation application 112 may utilize the location contact information of the destination along with the current location associated with source computing device 4 to generate navigational directions. The contact information may also include communication contact information that source computing device 4 may utilize to contact destination communication device 6, for example, a phone number or an email address.

As noted above, in one example, navigation application 112 may obtain the contact information associated with the destination through user input, directly input into navigation application 112. In another example, navigation application 112 may obtain the contact information associated with the destination by accessing a database of contacts stored on source computing device, e.g., an address book. In yet another example, navigation application 112 may obtain the contact information via another application running on source computing device 4, e.g., a browser, where the user may retrieve contact information on the Internet and indicate desire to obtain directions to an associated entity or destination.

In one example, during implementation or execution of navigation application 112, destination module 142 may be operable by processors 122 to obtain the contact information, as discussed above. In one example, during implementation or execution of navigation application 112, destination module 142 may generate a selectable item for display on user interface 130, along with the navigational directions. The selectable item may be utilized to initiate contact with a person or entity associated with the destination based on the communication contact information. During its operation, the user may select the selectable item to communicate with the person or entity associated with the destination without existing the navigation application. In this manner, the user may continue to see the navigational directions on user interface 130, while simultaneously being able to utilize the communication feature of source computing device 4. In one example, the user may select the item by touching a portion of a display where the item may be displayed to activate the item. In another example, the user may use a voice command to activate the selectable item.

In one example, selecting the selectable item may, for example, place a call to an associated phone number. In another example, selecting the selectable item may, for example, send a text message to as associated electronic address or phone number, where the message may be previously composed by the user. In another example, a destination may be associated with communication contact information comprising multiple items, e.g., multiple phone numbers. In this example, selecting the selectable item may display a list or more options, e.g., multiple phone numbers, whether the user wants to call or send a text, and the like. Additionally, in this example, each of the multiple options may be displayed as a selectable item. In one example, if the selectable item is associated with a text-based option (e.g., text message, e-mail, or the like), selecting the item may communicate a pre-set message, which the user may provide in advance for the specific destination or for navigation application 112. For example, the pre-set message may indicate a current location of source computing device 4, or a distance from the destination, or an expected arrival time, or the like.

Source computing device 4 may also include communication applications 144. Communication applications 144 may include a phone application, a text message application, an e-mail application, a microblogging application, a social networking application, and the like, that may be used to communicate with persons and entities associated with the destination. Navigation application 112 may interface with communication application so that navigation application 112 may include functionality to communicate with persons and entities associated with the destination. For example, communication applications 144 may provide background processes or services that may provide the communication functionality to navigation application 112, so that navigation application 112 may be used to communicate with persons and entities associated with the destination without exiting the navigation application 112. In some examples, communication applications 144 may include a communication module configured to place, via network interface 126, a voice-based communication from source computing device 4 to destination device 6, and communication applications 144 may also include a communication module configured to send, via network interface 126, a pre-set text message from source computing device 4 to destination communication device 6.

Processor 122 may be operable to execute one or more algorithms including, for example, a communication algorithm. In one example, the communication algorithm may generate communication links associated with a destination to be displayed in navigation application 112 according to the techniques of this disclosure. In some examples, the algorithm may determine the type of communication contact information associated with the destination and generate the appropriate links for display on user interface 130 while navigation application 112 is running.

Figure 4:
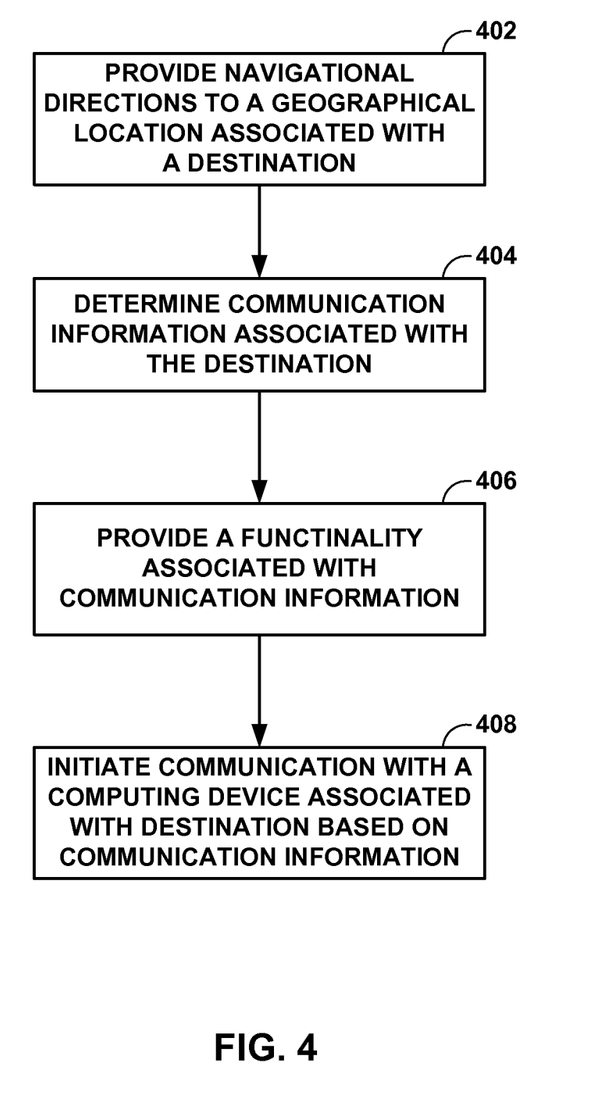
FIG. 4 is a flow diagram illustrating example operation of a computing device in communicating with a destination based on navigation information.

FIG. 4 is a flow diagram illustrating a method that may be performed by a computing device in accordance with one or more aspects of the present disclosure. For example, the illustrated example method may be performed, at least in part, by source computing device 4 (FIGS. 1 and 3). In some examples, a computer-readable storage medium (e.g., a medium included in storage device 128 of FIG. 3) may be encoded with instructions that, when executed, cause one or more processors (e.g., processor 122) to perform one or more of the acts illustrated in the method of FIGS. 1, 2, and 3.

The method of FIG. 4 includes providing for display, by a computing device (e.g., source computing device 4), navigational directions from a first geographical location associated with the computing device to a second geographical location associated with a destination (402). The second geographical location may be associated with at least one communication device (e.g., destination communication device 6). The computing device may determine contact information associated with the at least one communication device (404). The contact information may include location contact information and communication contact information. The computing device may obtain the contact information through user input, may be retrieved from a memory associated with the computing device, may be retrieved through a network (e.g., through the Internet), or may be received from another device (e.g., from the communication device).

The method may further include providing a functionality associated with the communication contact information (406). Providing the functionality may include providing for display, by the computing device, at least one user-selectable link associated with the contact information, and the at least one user-selectable link may be provided for display in conjunction with the navigational directions. The method may also include initiating communication from the computing device to the at least one communication device, based on the communication contact information (408). The communication may be initiated while the navigational directions are displayed by the computing device, in response to receiving a user action activating the at least one user-selectable link. For example, the communication may be initiated while the navigational directions are displayed by the computing device in response to receiving the user selection of the at least one link. In other examples, the user action activating the functionality may comprise voice input from the user.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention is:

1. A method comprising:
   outputting, by a first computing device and for display at a display device, navigational directions from a first geographical location associated with the first computing device to a second geographical location, wherein a second computing device is located at the second geographical location;
   determining, by the first computing device, contact information associated with the second computing device;
   responsive to receiving a user input, initiating a communication from the first computing device to the second computing device, the communication indicating a location status of the first computing device; and
   continuously outputting, by the first computing device and for display at the display device, the navigational directions while the first computing device transmits the communication to the second computing device.

2. The method of claim 1, further comprising:
   determining, by the first computing device, the location status of the first computing device based at least in part on a current location of the first computing device.

3. The method of claim 1, wherein the location status of the first computing device indicates at least one of: a current location of the first computing device; a distance between the current location of the first computing device and the second geographical location; and an estimated time of arrival of the first computing device at the second geographical location.

4. The method of claim 3, wherein initiating the communication comprises sending a text-based communication from the first computing device to the second communication device that includes the location status of the first computing device.

5. The method of claim 1, further comprising:
   outputting, by the first computing device and for display at the display device, at least one user-selectable link associated with the contact information, wherein the link is output for display in conjunction with the navigational directions.

6. The method of claim 1, wherein receiving the user input comprises receiving voice input from a user.

7. The method of claim 1, further comprising determining the contact information associated with the second computing device.

8. The method of claim 7, wherein determining the contact information comprises receiving, by the first computing device, user input that indicates the contact information.

9. The method of claim 7, wherein determining the contact information comprises retrieving the contact information from a list of contacts stored in the first computing device.

10. The method of claim 7, wherein determining the contact information comprises retrieving the contact information from an online source via the Internet.

11. The method of claim 1 further comprising receiving, by the first computing device, the contact information from the second computing device.

12. The method of claim 1, wherein the contact information comprises multiple contact items, wherein each of the multiple contact items comprises corresponding contact information.

13. The method of claim 12, further comprising:
    outputting, by the first computing device and for display at the display device, multiple user-selectable links, wherein each of the multiple user-selectable links is associated with a respective one of the multiple contact items, and wherein the multiple user-selectable links are output by the first computing device for display at the display device in conjunction with the navigational directions; and
    responsive to receiving a user selection of one of the multiple links, initiating the communication from the first computing device to the second computing device, based on the contact information associated with a corresponding item from the multiple contact items, while the navigational directions are output by the first computing device for display at the display device.

14. The method of claim 1, wherein initiating the communication comprises sending a voice-based communication from the first computing device to the second computing device.

15. The method of claim 1, wherein the first computing device comprises a mobile phone.

16. The method of claim 1, wherein the second computing device comprises a mobile phone.

17. A computing device comprising:
    one or more processors;
    at least one module operable by the one or more processors to:
       output, for display at a display device, navigational directions from a first geographical location associated with the computing device to a second geographical location, wherein a second computing device is located at the second geographical location; and
       determine contact information associated with the second computing device; and
    a network interface configured to:
       in response to receiving a user input, initiate a communication from the computing device to the second computing device, the communication indicating a location status of the computing device,
    wherein the at least one module is further operable by the one or more processors to continuously output, for display at the display device, the navigational directions while the computing device transmits the communication to the second computing device.

18. The computing device of claim 17, wherein the at least one module is further operable to output, for display at the display device, at least one user-selectable link associated with the contact information, wherein the link is output for display at the display device in conjunction with the navigational directions, and wherein the user action activating the functionality comprises a user selection of the at least one user-selectable link.

19. The computing device of claim 17, further comprising:
a communication module configured to send, via the network interface, a voice-based communication from the computing device to the second computing device.

20. A computer-readable storage device encoded with instructions that, when executed, cause one or more processors to perform operations comprising:
outputting, for display at a display device, navigational directions from a first geographical location associated with a first computing device to a second geographical location, wherein a second computing device is located at the second geographical location;
determining contact information associated with the second computing device;
responsive to receiving a user input, initiating communication from the first computing device to the second computing device, the communication indicating a location status of the first computing device; and
continuously outputting, for display at the display device, the navigational directions while the first computing device transmits the communication to the at least one communication device.

\* \* \* \* \*